United States Patent [19]
Nix

[11] Patent Number: 5,853,524
[45] Date of Patent: Dec. 29, 1998

[54] PNEUMATIC CIRCUIT FOR STRAPPING TOOL HAVING ADJUSTABLE TENSION CONTROL

[75] Inventor: Robert J. Nix, Algonquin, Ill.

[73] Assignee: Illinois Tool Works Inc., Glenview, Ill.

[21] Appl. No.: 883,555

[22] Filed: Jun. 26, 1997

[51] Int. Cl.$^6$ .................................................. B32B 31/00
[52] U.S. Cl. ................ 156/358; 100/33 PB; 137/624.14; 156/73.5; 156/366; 156/502; 156/580; 251/37
[58] Field of Search ............................ 156/64, 73.5, 358, 156/366, 502, 580; 100/33 PB; 137/624.14; 251/37

[56] References Cited

U.S. PATENT DOCUMENTS

| | | | |
|---|---|---|---|
| 3,093,114 | 6/1963 | Heidler | 173/93 |
| 3,198,218 | 8/1965 | Ericsson et al. | 140/151 |
| 3,506,041 | 4/1970 | Angarola | 140/93.4 |
| 3,679,519 | 7/1972 | Frey | 156/359 |
| 3,863,684 | 2/1975 | Simmons | 140/93.4 |
| 4,015,643 | 4/1977 | Cheung | 140/93.4 |
| 4,282,907 | 8/1981 | Massion et al. | 140/93.4 |
| 4,305,774 | 12/1981 | Wedeking et al. | 156/494 |
| 4,535,812 | 8/1985 | Miller | 137/624.11 |
| 4,629,530 | 12/1986 | Becking | 156/502 |
| 4,657,626 | 4/1987 | Cearlock et al. | 156/580 |
| 4,776,905 | 10/1988 | Cheung et al. | 156/73.5 |
| 5,169,480 | 12/1992 | Toppel et al. | 156/358 |
| 5,238,521 | 8/1993 | Cheung et al. | 156/502 |
| 5,306,383 | 4/1994 | Kobiella | 156/468 |
| 5,476,569 | 12/1995 | Harada | 156/502 |

OTHER PUBLICATIONS

Low–Cost Pneumatic Time–Delay Systems, Engineers' Digest, Aug., 1973, vol. 34, No. 8, pp. 29–31.
Pneumatically Delayed Control of Pneumatic Directional Control Valves, Olhydraulik und Pneumatik, 1971, vol. 15, No. 1, pp. 36–37.

*Primary Examiner*—James Sells

[57] ABSTRACT

A strapping tool has a timing control circuit incorporated therein which comprises a first pressure-operable valve for time-controlling a plastic strap welding operation, and a second pressure-operable valve for restricting fluid line flow from a source of fluid to an air drive motor of the tool during the tensioning phase of the strapping operation while permitting unrestricted fluid line flow from the source of fluid to the air drive motor of the tool during the welding stage of the strapping operation.

20 Claims, 3 Drawing Sheets

PNEUMATIC CIRCUIT FOR STRAPPING TOOL HAVING ADJUSTABLE TENSION CONTROL

CROSS-REFERENCE TO RELATED PATENT APPLICATIONS

This patent application is related to U.S. Pat. No. 5,169,480 which issued to Robert Toppel and David Crittenden on Dec. 8, 1992 and which is assigned to the assignee of record of the present patent application.

FIELD OF THE INVENTION

The present invention relates generally to hand-held pneumatically operated strapping tools, and more particularly, to a pneumatic control circuit incorporated within a hand-held pneumatically operated strapping tool for permitting adjustable control of the air drive motor, and therefore the amount of tension impressed upon the plastic strapping to be secured and fixed about different packages, articles, pallets, and the like, during both the strap tensioning and welding operative cycles.

BACKGROUND OF THE INVENTION

Tools for tightening and binding strapping about packages and articles have been utilized for many years, and many of the earlier tools were utilized to cinch and secure steel strapping with clips, clamps, and interlocking notches preformed within edge or surface portions of the strapping. The development and implementation of plastic strapping has enabled the replacement of the steel strapping and the need for the use of the aforenoted clips, clamps, and interlocking notch securing means and techniques. Typical use of such plastic strapping comprises the plastic strapping being initially constricted or looped about a package or article by means of a tool mechanism which drives one end of a pair of overlapped strap end portions so as to tighten the strap loop to a predetermined sensed tension value or load, and thereafter, while the strapping is held in position, the overlapped, tensioned strap ends are secured together by means of fusion welding.

As may be readily appreciated, however, special hand-held tools and procedural techniques are required to be utilized and implemented in connection with the use of such plastic strapping in order to ensure the achievement of sound welded joints as defined between the overlapped, tensioned strap ends of the strapping loop formed about the package or article. Such hand-held tools have comprised, for example, a feedwheel mechanism into which the overlapping strap portions are inserted, and an air motor which is activated so as to tighten the strapping about the package or article to a predetermined tension value or level which is indicated by means of the air motor stalling. Thereafter, a suitable welding assembly is actuated so as to perform the welding or fusion bonding operation. However, it has been found that the requisite time for achieving the fusion bonding or welding operation varies as a function of the particular type of plastic strapping being used, the thickness of the strapping being used, the width of the strapping being used, and other similar factors. Therefore, the successful completion of such a fusion bonding or welding operation has been partially dependent upon the ability of the operator to be able to properly judge that the fusion bonding or welding operation has in fact been successfully completed.

The aforenoted U.S. Pat. No. 5,169,480, which issued to Robert Toppel and David Crittenden, was in fact directed toward a hand-held, pneumatically-operated strapping tool wherein a pneumatically-controlled timing circuit was incorporated within the tool so as to control the fusion bonding or welding operation and thereby eliminate the necessity of depending upon the judgment of the tool operator in order to achieve successful completion of the fusion bonding or welding operation. More particularly, as illustrated in FIGS. 1–3 of the drawings, which correspond to FIGS. 1–3 of the aforenoted U.S. Pat. No. 5,169,480, the pneumatically-control-led timing circuit is generally indicated by the reference character 10 and the pneumatically-operated strapping tool is generally indicated by the reference character 12.

As best appreciated from FIG. 3, hand tool 12 is connected to a source of fluid 14 at a predetermined line pressure, and a manually-operated, normally-closed flow control valve 16 is fluidically connected to fluid source 14 by means of a fluid conduit 18. Depression of a manual actuator 20, operatively connected to flow control valve 16 and depressible by means of a lever 42, as shown in FIG. 1, moves flow control valve 16 to its open position, against the biasing force of a first spring-biasing means 19, so as to permit fluid flow from fluid source 14 to an air drive motor 22. Strapping tool 12 utilizes a feedwheel assembly 46, illustrated in FIGS. 1 and 2, to constrict or shrink a loop of strapping wrapped around an article or package such that a predetermined or limited amount of tension, as sensed by means of the air drive motor clutch slipping or the motor stalling, is placed upon the overlapped strap portions 50 and 52 without ostensibly or apparently over-tensioning of the same. Subsequently, the hand tool 12 is actuated so as to fusion weld the overlapped end portions 50 and 52 of the strapping at the predetermined tension by means of a vibratory welding assembly 32 also illustrated in FIGS. 1 and 2.

The fusion welding operation requires a relatively fixed period of time so as to achieve sound weldment of the overlapped and pretensioned strap end portions 50 and 52, however, as noted hereinabove, the welding time period has been dependent upon the judgment of the operator which may of course vary from individual to individual. Therefore, it was desirable to provide a repetitive welding cycle which was effectively independent of operator judgment. In accordance with this patented invention, the timing control circuit 10 and the vibratory welding assembly 32 for fusion bonding or welding of the overlapped end portions 50 and 52 of the plastic strapping are both simultaneously actuated by means of a handle 30.

As illustrated within FIGS. 1 and 2, the hand tool 12 comprises a motor housing 40 within which the air motor 12 is housed, and the air motor 12 is operatively connected to suitable transmission gearing or the like, not illustrated, which is disposed within a gearing housing 44 so as to drive a feed wheel of the feedwheel assembly 46. Depression of a control lever 48 opens the feedwheel assembly 46 so as to permit introduction of the overlapped strapping end portions 50 and 52 into a track 47 of the feedwheel assembly 46 as well as into the vibratory welding assembly 32, and release of the lever 48 secures the overlapped strapping end portions 50 and 52 within the track 47 of the feedwheel assembly 46 and the vibratory welding assembly 32. Subsequent depression of the lever 42 actuates valve stem or actuator 20 so as to permit fluid at the predetermined line pressure to flow from fluid pressure source 14 to the air drive motor 22 whereby the latter drives the feedwheel within the feedwheel assembly 46 so as to cinch or shrink the loop of strapping disposed about the article or package by drawing one of the overlapped end portions 50 and 52 of the strapping backwardly relative to the other one of the overlapped end portions 50 and 52 of the strapping until a predetermined amount of tension load is impressed upon or developed within the strapping which causes the air drive motor 22 to stall. After air drive motor 22 stalls at the predetermined strap tension, the welding cycle is initiated by rotating handle 30. More particularly, but briefly, rotation of the handle 30 causes disengagement of the air drive motor 22 from the feedwheel assembly 46 by disengaging a drive gear, not shown, of the feedwheel assembly 46, and substantially simultaneously, a brake mechanism, also not shown, is engaged so as to maintain the overlapped end portions 50 and 52 under the previously attained tensioned state. In addition, the air drive motor 22 is also operatively engaged with suitable mechanisms, not shown, of the vibratory welding assembly 32 whereby the vibratory welding assembly 32 is actuated so as to cause, for example, the upper overlapped strap end portion 50 to be rapidly moved in a transverse mode with respect to the lower strap end portion 52 whereby the taut or tensioned overlapped strap end portions 50 and 52 are welded together by means of friction welding techniques.

As noted hereinabove, the pneumatic timing control circuit 10 was incorporated within the strapping tool 12 so as to remove or eliminate operator judgment as a factor which would determine the proper welding time period in order to achieve a proper or satisfactory weld of the overlapped end portions 50 and 52 of the package or article strapping. In accordance with the patented invention, and with reference continuing to be made to FIG. 3, the timing control circuit 10 is seen to further include a normally-open, two-position pilot valve 60 which is incorporated within fluid conduit 18 so as to be interposed between the source of fluid pressure 14 and the manually-operative normally-closed flow control valve 16 of the air drive motor 22. Valve 60 is movable between its illustrated normally-open position, at which fluid flow is permitted from fluid pressure source 14 to the air drive motor 22, and a closed position at which fluid flow from fluid pressure source 14 is terminated so as to, in turn, terminate the drive of air drive motor 22 and to permit the latter to exhaust through means of valve 60 and an exhaust conduit 66 which is fluidically connected to the atmosphere. Second spring biasing means 64 is operatively associated with pilot valve 60 so as to bias the same toward its normally-open illustrated position. As will become apparent, a suitable force or fluid pressure impressed upon an actuator 62 operatively connected to pilot valve 60 is able to overcome the biasing force of spring biasing means 64 so as to move the pilot valve 60 from its normally-open illustrated position to the closed, exhaust position.

Another manually-operable, normally-closed two-position valve 70 is fluidically connected to the fluid pressure source 14 by means of a first fluid conduit 72, and the valve 70 is provided with a manually-operable actuator 76 which is engageable with and operated by handle 30 so as to move the valve 70 from its illustrated normally-closed position to an open position when a welding cycle is to be initiated. A third spring-biasing means 74, similar to the spring-biasing means 19 and 64 operatively associated with manually-operable valve 16 and pilot valve 60, is provided in conjunction with valve 70 so as to bias the same toward its normally-closed position. A second fluid conduit 78 fluidically connects the two-position valve 70 to a variable flow control valve 80 which comprises an adjustable orifice restriction 82, and a one-way check valve 84 disposed in parallel with respect to the adjustable orifice restriction 82. A third fluid conduit 88 fluidically connects variable flow control valve 80 to a fixed volume chamber or reservoir 90, and pressure-operable actuator 62 of pilot valve 60 is fluidically connected to third fluid conduit 88 through means of a fourth fluid conduit 92 so as to be responsive to line-pressure above a predetermined value whereby pilot valve 60 will be moved to its closed position so as to terminate fluid flow through fluid conduit 18, as previously transmitted from fluid pressure source 14 to air drive motor 22, whereupon the operation of the air drive motor 22 is terminated and the latter is permitted to exhaust through means of fluid conduit 18, pilot valve 60, and exhaust conduit 66 at the end of an operating cycle.

In operation, when the welding cycle is to be initiated, and has been briefly noted hereinbefore, when handle 30 is moved so as to activate the vibratory welding assembly 32, handle 30 also engages or encounters the manually-operable actuator 76 of the two-position valve 70 so as to move the latter to its opened position, against the biasing force of the spring 74, at which position fluid flow is permitted to flow through valve 70 to variable flow control valve 80. Fluid, at the predetermined line pressure from fluid pressure source 14, is therefore conducted through the first fluid conduit 72, having a filter 96 disposed therein, the adjustable orifice 82, and the third fluid conduit 88 so as to fill reservoir or volume chamber 90 at a predetermined controlled rate and within a predetermined or known period of time. As reservoir or volume chamber 90 is filled, the fluid pressure within the third fluid conduit 88 is communicated, by means of the fourth fluid conduit 92, to the pressure-operable actuator 62 of the pilot valve 60 whereby pilot valve 60 is moved, at a predetermined pressure value, from its normally open position to its closed position, against the biasing force of spring biasing means 64, whereby fluid communication from fluid pressure source 14 to air drive motor 22, by means of fluid conduit 18, is now terminated thereby terminating the welding cycle in view of the fact that the air drive motor 22 is no longer able to drive or energize the aforenoted components of the vibratory welding assembly 32. In addition, the air drive motor 22 is now fluidically connected to atmosphere through means of flow control valve 16, fluid conduit 18, the closed pilot valve 60, and exhaust conduit 66. When lever 42 is released, flow control valve 16 is returned to its normally-closed position by spring biasing means 19, and when handle 30 is released, spring biasing means 74 returns flow control valve 70 to its normally-closed position at which second fluid conduit 78 is now fluidically connected to exhaust. As a result, third and fourth fluid conduits 88 and 92 rapidly exhaust through means of one-way check valve 84 and second fluid conduit 78 whereby fluid reservoir or volume chamber 90 is exhausted or evacuated, and pilot valve 60 is permitted to return to its normally open position in readiness for a new operative cycle.

It is therefore to be appreciated that the provision of adjustable orifice 82 within variable flow control valve 80 permits adjustment or variation of the rate of fluid transfer therethrough so as to control the period of time required for filling the reservoir or volume chamber 90. Such control of the time required for filling reservoir or volume chamber 90, in turn, controls, adjusts, or predetermines the time delay between the opening of valve 70 and the closing of pilot valve 60, or in other words, controls, adjusts, or predetermines the length of time of the welding cycle. In addition, the use of such components as incorporated within the timing control circuit 10 permits the length of time of the welding cycle to be controlled or predetermined in a substantially automatic manner without requiring any input, judgment, or monitoring processes to be performed by means of the operator personnel.

FIG. 2 illustrates the timing control circuit 10 as actually incorporated within the strapping tool 12, and it is seen that the pilot valve 60 is disposed within a cylindrical passage 100 which is formed within a rear portion 102 of the motor housing 40. The source of fluid pressure, not shown, is fluidically connected to the tool 12 by means of an inlet bore 104. A second bore 106 fluidically communicates passage 100 and a groove region 61 of the pilot valve 60 to the first fluid conduit 72 which is fluidically connected to the normally-closed flow control valve 70. Second fluid conduit 78 fluidically connects flow control valve 70 to the variable flow control valve 80, and third fluid conduit 88 fluidically connects the variable flow control valve 80 to the reservoir or volume chamber 90 which, in this illustrated instance, comprises sinusoidal tubing of a fixed length and cross-section so as to provide the necessary or predetermined volume for fluid transfer and back-pressure communication to the pilot valve 60 through means of the fourth fluid conduit 92. Fourth fluid conduit 92 terminates within a cavity 98 defined within the lower end of cylindrical passage 100 such that the fluid pressure conducted by fourth fluid conduit 92 can impinge against land area 110 of the pilot valve 60 so as to move the latter to its closed position. At the closed position, land area 110 effectively blocks inlet bore 104 whereby fluid flow from the fluid pressure source, not shown, is prevented from being transmitted to the air drive motor whereby the joining and welding cycle of the tool 12 is terminated.

While the aforenoted strapping tool 12 has of course operated quite satisfactorily from the viewpoint of properly controlling the welding period without requiring operative judgments to be made by the operator personnel, in view of the incorporation within the tool of the integral timing control circuit 10, it has been observed and determined that despite the stalling of the air drive motor 22, during the tensioning phase of the strapping around the package, article, or pallet being strapped, as a means of allegedly indicating the proper tensioning of the strapping around the package, article, or pallet without over-tensioning and deleteriously affecting the strapping, there have been occurrences wherein the structural integrity of the strapping has in fact been compromised, and packages, articles, or pallets being wrapped have also been damaged. These results have occurred, for example, as a result of the use of particular tools with different types of strapping which may comprise strapping components having different width dimensions, different thickness dimensions, being fabricated from different physical materials, and the like. In addition, it is well-known that the same motor may exhibit different torque output values at different times during its service lifetime, such as, for example, when motors are new as opposed to when the motors have been operative for a predetermined period of time. For example, a motor tends to become more efficient after a predetermined break-in period. Consequently, the motor, when new, may initially exhibit a particular horsepower or torque output value which permits the motor to attain a particular tension limit or value in connection with the stressing of the package strapping, however, once the motor undergoes a predetermined break-in period, the horsepower or torque output of the motor can be significantly greater whereby the motor can attain a greater tension limit or value in connection with the stressing of the package strapping. Still further, different packages, articles or pallets being wrapped may require different strap tensioning or stressing values or limits. For example, the packaging of solid steel rods requires different packaging parameters than the packaging of sheet metal products, window panes, or other types of fragile structural components. The control of the air drive motor must therefore be able to be adjustably controlled during the tensioning phase of the strapping operation, however, it is further imperative that during the welding phase of the entire strapping operation, the motor output and speed must be maximized in order to optimize the structural characteristics of the weldments defined between the overlapped strapping end portions. In particular, it is desirable that the welding time period be as short as possible, that is, the maximum amount of BTUs are impressed upon the overlapped end portions of the strapping within the shortest period of time. This results in less overall heat build-up and permits more rapid cooling.

Accordingly, there is a need in the art for a strapping tool having a pneumatic timing control circuit incorporated therein whereby, in addition to the timed control of the welding phase of the strapping operation so as to obviate the need for any monitoring of the welding phase of the strapping operation by operator personnel in order to judge or determine when the welding phase or stage of the strapping operation is properly completed, as was achieved by means of the invention disclosed within the aforenoted patent, the line flow of the pressurized air from the fluid source to the air drive motor can be optimally controlled at different levels or values during both the strap tensioning and strap welding stages or phases of the strapping operation so as to achieve, for example, adjustably controlled, restricted, or modulated line flow of the pressurized air from the fluid source to the air drive motor during the tensioning phase or stage of the strapping operation, as desired or required depending upon the particular parameters or characteristics of the strapping being utilized, as well as the particular parameters or characteristics of the packages, articles, packages, or pallets being wrapped, so as not to deleteriously affect the structural integrity of the strapping or that of the packages, articles, or pallets being strapped, while nevertheless achieving full, unrestricted line flow of the pressurized air from the fluid source to the air drive motor during the welding phase or stage of the strapping operation so as to optimize the welding characteristics of the weldment regions defined between the overlapped end portions of the strapping.

OBJECTS OF THE INVENTION

Accordingly, it is an object of the present invention to provide a new and improved strapping tool.

Another object of the present invention is to provide a new and improved strapping tool which has incorporated therein a new and improved timing control circuit for controlling the welding cycle, phase, or stage of the strapping operation.

A further object of the present invention is to provide a new and improved strapping tool which has incorporated therein a new and improved timing control circuit wherein not only is the welding cycle, phase, or stage of the strapping operation able to be properly adjustably controlled, but in addition, line flow of the pressurized air from the fluid pressure source to the air drive motor of the tool is able to be adjustably controlled in a restricted or modulated manner during the tensioning phase or stage of the strapping operation so as to optimally control the tension level or stresses imparted to the strapping during such tensioning phase or stage of the strapping operation, whereas during the welding phase or stage of the strap-ping operation, full, unrestricted line flow of the pressurized air from the fluid pressure source to the air drive motor is achieved so as to maximize or optimize the welding parameters or characteristics of the weldment defined between the overlapped end portions of the strapping.

SUMMARY OF THE INVENTION

The foregoing and other objects of the present invention are achieved through the provision of a new and improved strapping tool having incorporated therein a new and improved timing control circuit wherein the strapping tool comprises a strap-tensioning feedwheel assembly; a vibratory welding assembly; and an air drive motor, adapted to be fluidically connected to a source of fluid pressure, of the pneumatic timing control circuit, so as to be able to drive the feedwheel strap-tensioning assembly as well as the vibratory welding assembly; and the pneumatic timing control circuit comprises the first and second normally-closed, manually operable flow control valves, the normally-open, pressure operable pilot valve, and the variable flow control valve of the previously noted patented system. In addition, a second, pressure-responsive, two-position, pilot or flow-control valve is provided with an adjustable flow restrictor within a first fluid passageway thereof, and a second unrestricted fluid passageway, and the second pressure-responsive two-position flow-control or pilot valve is incorporated within the control circuit such that during the tensioning phase of the strapping operation, the second, pressure-responsive, two-position, pilot or flow-control valve is disposed at its first position at which adjustably restricted or modulated line flow is transmitted from the fluid pressure source to the air drive motor, whereas during the welding phase or cycle of the strapping operation, the second, pressure-responsive, two-position, pilot or flow control valve is disposed at its second position at which full line flow is transmitted from the fluid pressure source to the air drive motor. Consequently, not only is the welding cycle of the strapping operation adjustably time-controlled, but in addition, adjustable control, restriction, or modulation of the air line flow to the air drive motor is achieved as desired during the tensioning phase or stage of the strapping operation, whereas full, unrestricted air line flow to the air drive motor is achieved as desired during the welding phase or cycle of the strapping operation.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 3:
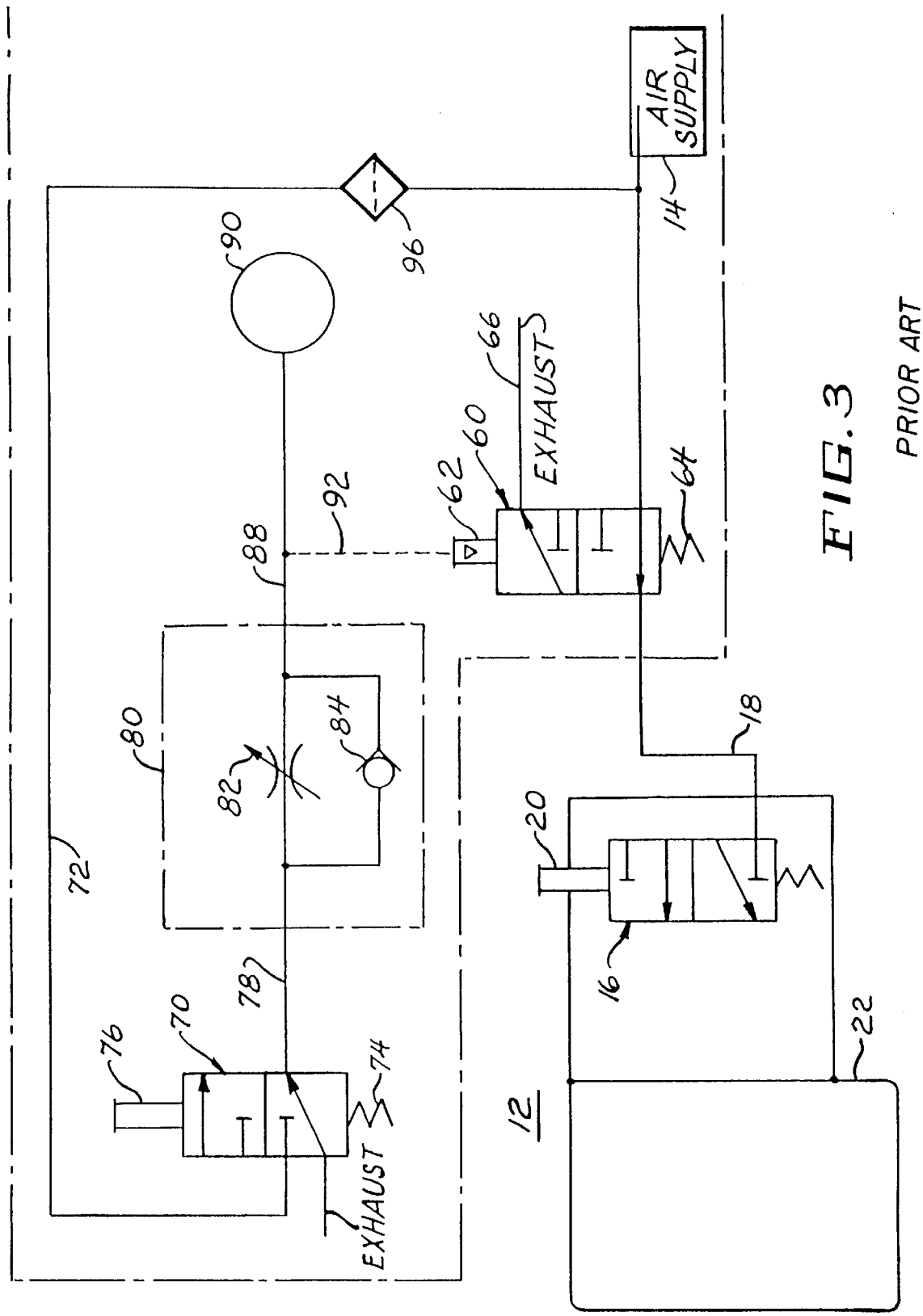
FIG. 3 is a schematic diagram showing the pneumatic timing control circuit of the aforenoted patent.
Figure 4:
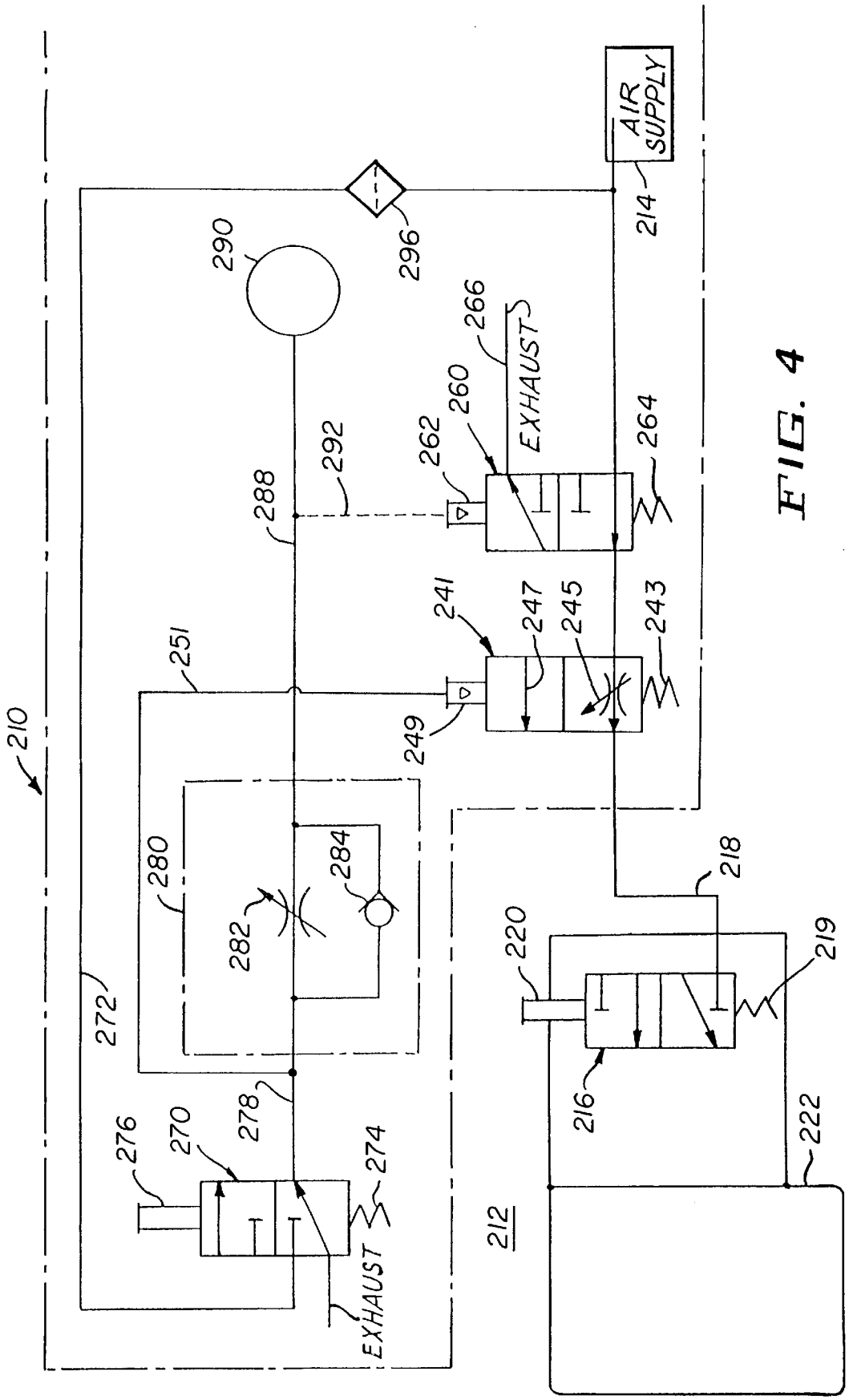
FIG. 4 is a schematic diagram, similar to that of FIG. 3, showing, however, the new and improved pneumatic timing control circuit developed and constructed in accordance with the teachings of the present invention.

Referring again to the drawings, and with reference now being particularly made to FIG. 4 thereof, the new and improved pneumatic timing control circuit of the present invention is disclosed and generally indicated by the reference character 210. The timing control circuit 210 is substantially the same as the timing control circuit 10 of FIG. 3, except for the differences which will be described shortly, and consequently, the various component parts of the timing circuit 210 have been designated by reference characters which correspond to those designating the similar parts of the timing control circuit 10 of FIG. 3 except that the reference characters for the component parts of the timing control circuit of FIG. 4 are in the 200 series.

The newly added feature or component of the timing control circuit 210 of the present invention as embodied within FIG. 4 is seen to comprise a second pressure-responsive, two-position pilot valve 241 which is normally biased to a first illustrated position by a spring-biasing means 243 such that a first fluid passageway, having an adjustable flow restrictor 245 disposed therein, is fluidically aligned with fluid conduit 218. Two-position pilot valve 241 is also provided with a second, non-restricted fluid passageway 247 which is able to be fluidically aligned with fluid conduit 218 when the two-position pilot valve 241 is moved to its second position against the biasing force of spring-biasing means 243. Two-position pilot valve 241 further comprises a pressure-actuator 249 which is similar to the pressure actuator 262 of the pilot valve 260, and pressure-actuator 249 is fluidically connected to the second fluid conduit 278, at a position which is upstream of the variable flow control valve 280, by means of a fifth fluid conduit 251.

The operation of the strapping tool 212, including the tensioning and welding phases, stages, or cycles thereof, and having the new and improved timing control circuit 210 incorporated therein, will now be described. The first two-position pilot valve 260 is normally disposed at its open illustrated position, as a result of being biased to such position by spring-biasing means 264, such that pressurized fluid from air supply or fluid source 214 flows through valve 260 along fluid conduit 218 toward tool 212 and its operatively associated air drive motor 222. The second two-position pilot valve 241 is normally disposed at its illustrated position, as a result of being biased to such position by spring-biasing means 243, such that the pressurized fluid from air supply or fluid source 214 flows through the adjustable restrictor 245 whereby the line flow from the air supply or fluid pressure source 214, and supplied to the air drive motor 222 of the tool 212, is suitably adjusted, restricted, or modulated as desired or required. Consequently, when the tensioning phase or stage of the strapping operation is initiated, as a result of the lever 42 of the tool 12 or 212 being depressed so as to in turn depress or move the valve stem or actuator 220 of the normally-closed, manually operable, two-position, flow-control valve 216, valve 216 is moved to its open position at which the fluid flow from air supply or fluid pressure source 214, as suitably adjusted, restricted, or modulated by means of the second pilot valve 241, is supplied to the air drive motor 222 so as to actuate the same in order to in turn drive the feedwheel assembly 46 at a suitably adjusted, predetermined horsepower level in order to properly tension the overlapped end portions 50 and 52 of the strapping without deleteriously affecting the strapping or the articles, packages, or pallets being strapped.

Figure 1:
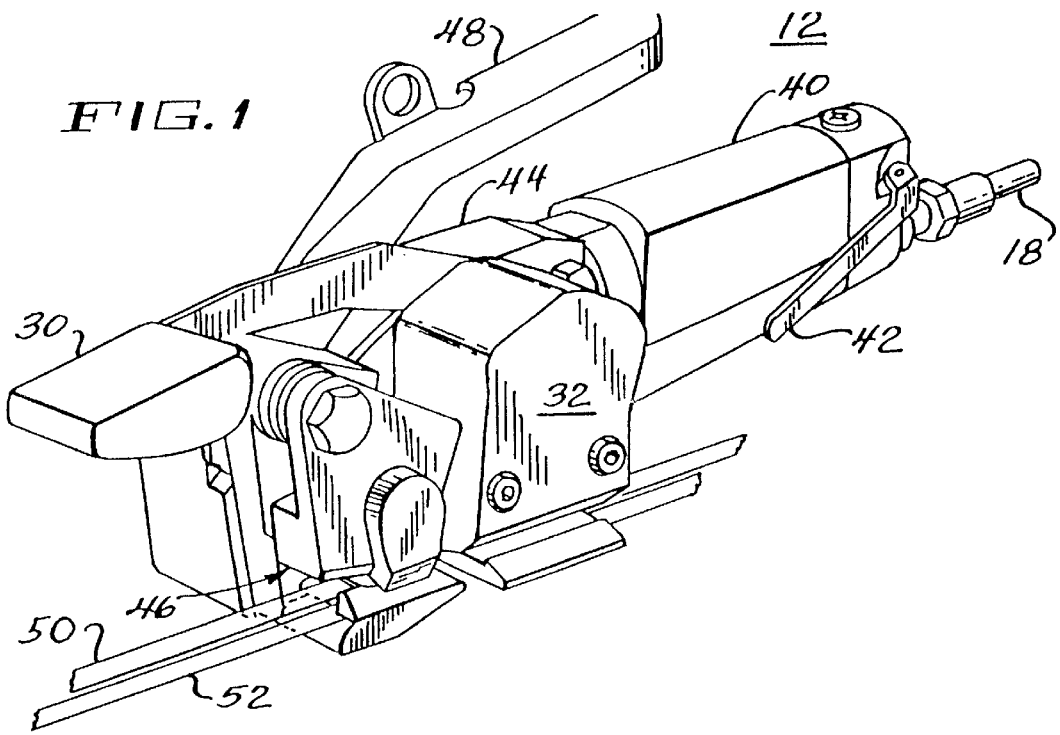
FIG. 1 is a perspective view of a strapping tool within which the new and improved pneumatic timing control circuit of the present invention may be incorporated.
Figure 2:
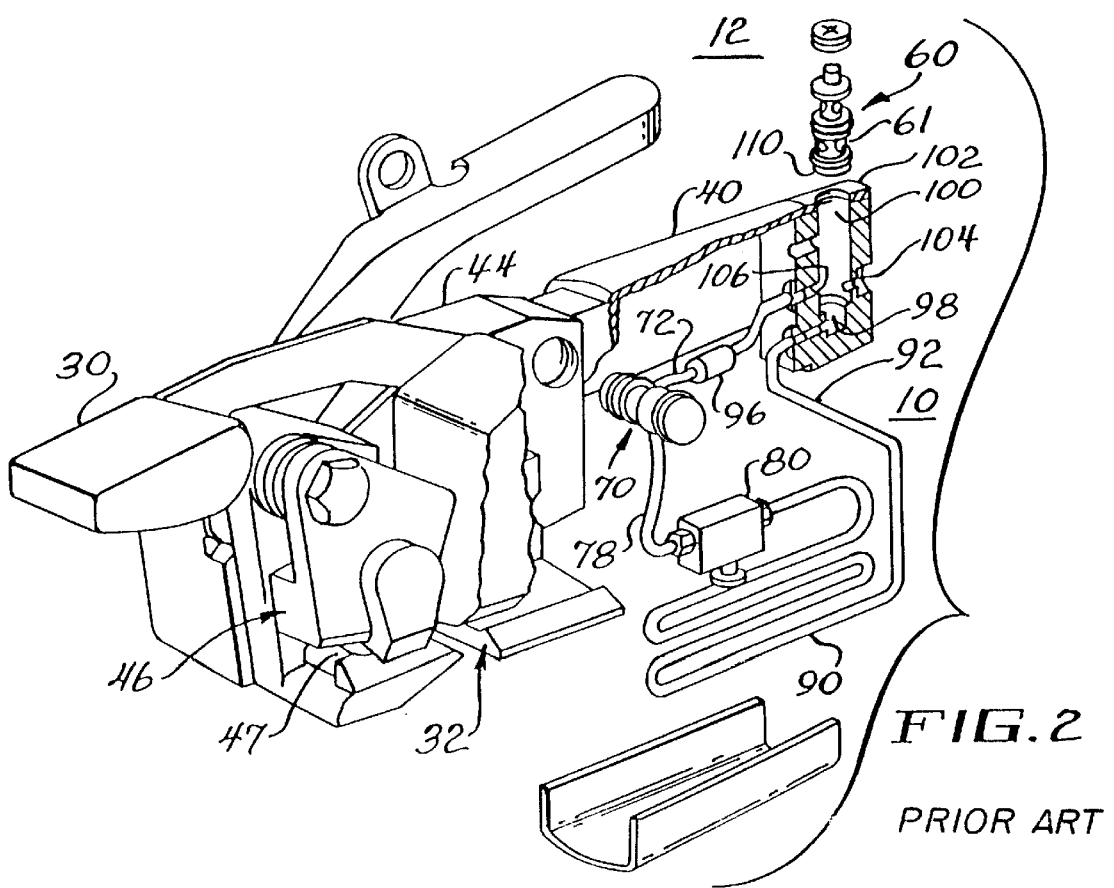
FIG. 2 is a perspective view, partially exploded, of a strapping tool, similar to the tool of FIG. 1, within which the pneumatic timing control circuit of the aforenoted patent has been incorporated.

After the air drive motor 222 stalls indicating the attainment or completion of the tensioning phase or stage of the strapping operation, the welding phase or stage of the strapping operation is initiated as a result of handle 30 being moved or rotated from its position illustrated in FIG. 1 whereby manually-operable actuator 276 of normally-closed, manually-operated, two-position flow control valve 270 is engaged or encountered thereby so as to move the flow control valve 270, against the biasing force of spring-biasing means 274, to its second open position at which full line flow from the air supply or fluid pressure source 214, as transmitted along first fluid conduit 272, is transmitted therethrough toward variable flow control valve 280 along second fluid conduit 278. At the same time, it is to be noted that full line flow from the air supply or fluid pressure source 214 is likewise transmitted along second fluid conduit 278 and fifth fluid conduit 251 so as to impinge upon pressure-responsive actuator 249 of the two-position pilot valve 241 whereby the latter is moved, against the biasing force of spring-biasing means 243, from its illustrated first position to its second position at which its second, non-restricted passageway 247 is now disposed in fluidic communication with fluid conduit 218. In this manner, full line flow from air supply or fluid pressure source 214 is now conducted through fluid conduit 218 and manually-operable two-position flow control valve 216 to the air drive motor 222 such that the air drive motor 222 is driven at its full horsepower rating so as to in turn activate the vibratory welding assembly 32 in its full power mode and thus achieve optimal welding results.

As was the case with the timing control circuit 10 of FIG. 3, and aside from the fluid flow along fifth fluid conduit 251, full line flow from air supply or fluid pressure source 214 is also conducted along the second fluid conduit 278, through the adjustable flow restrictor 282 of the variable flow control valve 280, and along third fluid conduit 288 toward reservoir or volume chamber 290. The build-up of pressure within third fluid conduit 288 and reservoir or volume chamber 290, and within a predetermined amount of time, is transmitted to the fourth fluid conduit 292 so as to impinge upon the pressure-responsive actuator 262 of the first two-position pilot valve 260 whereby the latter is moved, against the biasing force of spring-biasing means 264, from its illustrated first position to its second position at which the exhaust passage 266 is now in fluidic communication with fluid conduit 218. In this manner, line flow from air supply or fluid pressure source 214 to air drive motor 222 is terminated, and the air drive motor 222 is permitted to be exhausted to atmosphere through means of flow control valve 216, fluid conduit 218, unrestricted passageway 247 of pilot valve 241, and exhaust line 266 of pilot valve 260.

In a similar manner, the two-position flow control valve 270 and the vibratory welding assembly 32 are maintained in their open and engaged positions, respectively, as long as the handle 30 is maintained at its rotated or moved position, although the vibratory welding assembly 32 is not driven at this time due to the termination of the drive of air drive motor 222 as noted in the preceding paragraph. When handle 30 is released, flow control valve 270 is returned to its normally closed position by spring-biasing means 274 whereby second fluid conduit 278 is now disposed in fluidic communication with the exhaust line or passage of the flow control valve 270. As a result of such fluidic communication being established, fluid flow or pressure from reservoir or volume chamber 290, as well as from fourth fluid conduit 292, pressure-responsive actuator 262, and pilot valve 260, is able to be exhausted along third fluid conduit 288 as permitted through check valve 284, whereby pilot valve 260 is returned to its normally-open illustrated position under the influence of the spring-biasing means 264. In a similar manner, fluid flow or pressure from fifth fluid conduit 251, pressure-responsive actuator 249, and pilot valve 241, is also permitted to exhaust through second fluid conduit 278 and flow control valve 270 whereby pilot valve 241 is permitted to return to its illustrated position under the influence of spring-biasing means 243. A complete operative cycle has therefore occurred and the tool 212 is readied for a new strapping cycle.

It is thus seen and appreciated that in accordance with the new and improved timing control circuit of the present invention, not only is the automatic, predeterminedly timed welding cycle preserved in accordance with the teachings of the aforenoted related patent such that the welding cycle is not dependent upon operator personnel judgments, but in addition, variably adjusted, restricted, or modulated line flow is able to be conducted to the air drive motor during the tensioning phase or stage of the strapping operation so as to be able to drive the air drive motor at variably adjusted, modulated, or restricted power levels as is required during such tensioning phase or stage of the strapping operation, whereas still further, unrestricted full line flow is able to be conducted to the air drive motor during the welding stage or phase of the strapping cycle so as to be able to drive the air drive motor at its full horsepower level as is desired during such welding phase or stage of the strapping operation in order to achieve optimal welding characteristics between the overlapped end portions of the strapping.

Obviously, may modifications and variations of the present invention are possible in light of the above teachings. It is therefore to be understood that within the scope of the appended claims, the present invention may be practiced otherwise than as specifically described herein.

What is new and desired to be secured by Letters of the United States of America is:

1. A timing control arrangement for a fluid-actuatable tool, comprising:

first, normally-closed means for controlling fluid flow from a source of fluid at a predetermined line pressure to said tool;

second, normally-open means, disposed within a first fluid conduit connecting said first, normally-closed fluid flow controlling means to said source of fluid so as to be interposed between said first, normally-closed fluid flow controlling means and said source of fluid, for controlling fluid flow from said source of fluid to said first, normally-closed fluid flow controlling means;

third, normally-closed means, having an upstream end and a downstream end, for controlling fluid flow from said source of fluid to said second, normally-open fluid flow controlling means;

a second fluid conduit fluidically connecting said source of fluid to said upstream end of said third, normally-closed fluid flow controlling means;

a fluid reservoir having a predetermined volume;

a third fluid conduit fluidically connecting said downstream end of said third, normally-closed fluid flow controlling means to said reservoir;

variable flow-controlling means, disposed within said third fluid conduit so as to be interposed between said fluid reservoir and said downstream end of said third normally-closed fluid flow controlling means, for controlling the rate of fluid flow to said reservoir and the time for attaining fluid at said predetermined line pressure within said reservoir and said third fluid conduit after said third, normally-closed fluid flow controlling means has been moved from a closed position to an open position;

said second, normally-open fluid flow controlling means being fluidically connected to said third fluid conduit at a position disposed downstream of said variable flow-controlling means such that said second, normally-open fluid flow controlling means is responsive to said fluid at said predetermined line pressure within said third fluid conduit whereby said second, normally-open fluid flow controlling means is moved from an open position to a closed position so as to interrupt fluid flow from said source of fluid to said first, normally-closed fluid flow controlling means and said tool even when said first, normally-closed fluid flow controlling means has been moved to an open position so as to actuate said tool; and two-position fluid flow controlling means, disposed within said first fluid conduit and fluidically connected to said third fluid conduit at a position upstream of said variable flow-controlling means so as to be responsive to said fluid at said predetermined line pressure within said third fluid conduit when said third, normally-closed fluid flow controlling means is disposed at said open position, for providing restricted fluid flow from said source of fluid to said tool as a result of said two-position fluid flow controlling means being disposed at a first position when said third, normally-closed fluid flow controlling means is disposed at said closed position, and for providing unrestricted fluid flow from said source of fluid to said tool as a result of said two-position fluid flow controlling means being moved, from said first position to a second position, by said fluid at said predetermined line pressure within said third fluid conduit when said third, normally-closed fluid flow controlling means is disposed at said open position.

2. The timing control arrangement as set forth in claim 1, wherein:
   said first, normally-closed fluid flow controlling means, said second, normally-open fluid flow controlling means, said third, normally-closed fluid flow controlling means, and said two-position fluid flow controlling means all comprise two-position valves.

3. The timing control arrangement as set forth in claim 1, wherein:
   said first and third normally-closed fluid flow controlling means comprise manually operable two-position valves.

4. The timing control arrangement as set forth in claim 1, wherein said variable flow-controlling means comprises:
   an adjustable flow control valve; and
   a one-way check valve disposed parallel to said adjustable flow control valve and connected to said third fluid conduit at locations upstream and downstream of said adjustable flow control valve so as to bypass said adjustable flow control valve and exhaust said fluid reservoir through said third normally-closed means when said fluid-actuatable tool is deactivated as a result of said second, normally-open fluid flow controlling means being moved to said closed position so as to interrupt said fluid flow from said source of fluid to said fluid-actuatable tool and said third, normally-closed fluid flow controlling means is returned to said closed position.

5. The timing control arrangement as set forth in claim 1, wherein:
   said reservoir comprises a predetermined length of tubing having a predetermined diametrical extent and connected between said variable flow-controlling means and said second, normally-open fluid flow controlling means.

6. The timing control arrangement as set forth in claim 1, wherein:
   said two-position fluid flow controlling means comprises an adjustable restrictor for providing adjustable levels of said restricted fluid flow.

7. A timing control arrangement for a pneumatically operable tool for tightening and securing a loop of plastic strapping around a package, comprising:
   a source of fluid at a predetermined line pressure;
   a first, manually-operable, normally-closed valve interposed between said tool and said source of fluid at said predetermined line pressure;
   a first fluid conduit fluidically connecting said first, manually-operable, normally-closed valve and said source of fluid at said predetermined line pressure;
   a second, pressure-operable, normally-open valve disposed within said first fluid conduit so as to be interposed between said first, manually-operable, normally-closed valve and said source of fluid at said predetermined line pressure and having a pressure-actuator which is operatively responsive at said predetermined line pressure to close said second, pressure-operable, normally-open valve and thereby interrupt fluid flow from said source of fluid to said first, manually-operable, normally-closed valve;
   a third, manually-operable, normally-closed valve having an upstream end and a downstream end;
   a fluid reservoir having a predetermined volume;
   variable flow-controlling means for adjustably controlling the rate of fluid flow therethrough;
   a second fluid conduit fluidically connecting said source of fluid at said predetermined line pressure to said upstream end of said third, manually-operable, normally-closed valve;
   a third fluid conduit fluidically connecting said downstream end of said third, manually-operable, normally-closed valve to said variable flow-controlling means;
   a fourth fluid conduit fluidically connecting said variable flow-controlling means to said reservoir;
   a fifth fluid conduit fluidically connecting said fourth fluid conduit to said pressure-responsive pressure actuator of said second, pressure-operable, normally-open valve;
   said variable flow-controlling means being operable to control said rate of fluid flow to said reservoir and to said fifth fluid conduit, and the time for attaining fluid at said predetermined line pressure within said reservoir and said fifth fluid conduit, after said third, manually-operable, normally-closed valve has been opened so as to actuate said pressure-responsive pressure actuator of said second, pressure-operable, normally-open valve and thereby close said second, pressure-operable, normally-open valve so as to terminate fluid flow from said source of fluid to said first, manually-operable, normally-closed valve, and thereby terminate operation of said tool, even when said first, manually-operable, normally-closed valve has been opened so as to permit fluid flow from said source of fluid to said tool in order to operate said tool; and
   a fourth, pressure-operable, two-position valve, disposed within said first fluid conduit and fluidically connected to said third fluid conduit by a sixth fluid conduit so as to be responsive to said fluid at said predetermined line pressure within said third fluid conduit when said third, manually-operable, normally-closed valve is opened, for providing restricted fluid flow from said source of fluid to said first, manually-operable, normally-closed valve and said tool, as a result of said fourth, pressure-operable, two-position valve being disposed at a first position when said third, manually-operable, normally-closed valve is disposed at said closed position, such that said tool is operable at a restricted power level during a first tightening phase of a strapping operation, and for providing unrestricted fluid flow from said source of fluid to said first, manually-operable, normally-closed valve and said tool, as a result of said fourth, pressure-operable, two-position valve being moved, from said first position to a second position, by said fluid at said predetermined line pressure within said sixth fluid conduit when said third, manually-operable, normally-closed valve is disposed at said open position, such that said tool is operable at an unrestricted power level during a second securing phase of a strapping operation.

8. The timing control arrangement as set forth in claim 7, wherein said variable flow-controlling means comprises:
   an adjustable flow control valve; and
   a one-way check valve disposed parallel to said adjustable flow control valve and fluidically connected to said third and fourth fluid conduits at locations upstream and downstream of said adjustable flow control valve so as to bypass said adjustable flow control valve and exhaust said fluid reservoir through said third, manually-operable, normally-closed valve when operation of said tool is terminated as a result of said second, pressure-operable, normally-open valve being moved to said closed position so as to interrupt said fluid flow from said source of fluid to said first, manually-operable, normally-closed valve and said tool, and when said third, manually-operable, normally-closed valve is returned to said closed position.

9. The timing control arrangement as set forth in claim 7, wherein:
   said reservoir comprises a predetermined length of tubing having a predetermined diametrical extent and connected to between said variable flow-controlling means and said second, pressure-operable, normally-open valve.

10. The timing control arrangement as set forth in claim 7, wherein:
    said fourth, pressure-operable, two-position valve comprises an adjustable restrictor for providing adjustable levels of said restricted fluid flow.

11. A timing control arrangement for providing an adjustable and predeterminable operating period of time within a pneumatically-operable device in order to control an operative cycle of said device, comprising:
    a first fluid conduit fluidically connecting said device to a source of fluid at a predetermined line pressure;
    a first, manually-operable, normally-closed valve having an open position to which said first, manually-operable, normally-closed valve is movable from a normally-closed position;
    a second fluid conduit fluidically connecting said source of fluid at said predetermined line pressure to said first, manually-operable, normally-closed valve;
    variable flow-controlling means for adjustably controlling the rate of fluid flow therethrough;
    a third fluid conduit fluidically connecting said first, manually-operable, normally-closed valve to said variable flow-controlling means;
    a fluid reservoir having a predetermined volume;
    a fourth fluid conduit fluidically connecting said variable flow-controlling means to said fluid reservoir;
    said variable flow-controlling means being operable to control said rate of fluid flow to said fourth fluid conduit and to said reservoir, and the time for attaining fluid at said predetermined line pressure within said fourth fluid conduit and said reservoir, after said first, manually-operable, normally-closed valve is moved to said open position;
    a second, pressure-operable, normally-open valve disposed within said first fluid conduit between said source of fluid and said pneumatically-operable device for normally providing fluid flow to said pneumatically-operable device when said second, pressure-operable, normally-open valve is disposed at its normally-open position, and comprising a pressure-responsive actuator fluidically connected to said fourth fluid conduit such that said second, pressure-operable, normally-open valve is operable by said predetermined line pressure within said fourth fluid conduit so as to be movable from said normally-open position to a closed position so as to block fluid flow from said source of fluid to said pneumatically-operable device at a predetermined time after manual actuation of said first, manually-operable, normally-closed valve to said open position; and
    a third, pressure-operable, two-position valve, disposed within said first fluid conduit and fluidically connected to said third fluid conduit at a position upstream of said variable flow-controlling means so as to be responsive to said fluid at said predetermined line pressure within said third fluid conduit when said first, manually-operable, normally-closed valve is disposed at said open position, for providing restricted fluid flow from said source of fluid to said pneumatically-operable device as a result of said third, pressure-operable, two-position valve being disposed at a first position when said first, manually-operable, normally-closed valve is disposed at said closed position, and for providing unrestricted fluid flow from said source of fluid to said pneumatically-operable device as a result of said third, pressure-operable, two-position valve being moved, from said first position to a second position, by said fluid at said predetermined line pressure within said third fluid conduit when said first, manually-operable, normally-closed valve is disposed at said open position.

12. The timing control arrangement as set forth in claim 11, wherein said variable flow-controlling means comprises:
    an adjustable flow control valve; and
    a one-way check valve disposed parallel to said adjustable flow control valve and connected to said third and fourth fluid conduits at locations upstream and downstream of said adjustable flow control valve so as to bypass said adjustable flow control valve and exhaust said fluid reservoir through said first, manually-operable, normally-closed valve when said pneumatically-operable device is deactivated as a result of said second, pressure-operable, normally-open valve being moved to said closed position so as to block said fluid flow from said source of fluid to said pneumatically operable device and said first, manually-operable, normally-closed valve is returned to said closed position.

13. The timing control arrangement as set forth in claim 11, wherein:

said reservoir comprises a predetermined length of tubing having a predetermined diametrical extent and connected between said variable flow-controlling means and said second, pressure-operable, normally-open valve.

14. The timing control arrangement as set forth in claim 11, wherein:

said third, pressure-operable, two-position valve comprises an adjustable restrictor for providing adjustable levels of said restricted fluid flow.

15. A pneumatically-operable tool for tightening and securing a loop of plastic strapping around a package, and having a pneumatic timing control circuit incorporated therein for providing an adjustable and predeterminably time-controlled operative cycle, comprising:

a pneumatically-driven motor;

a first fluid conduit fluidically connecting said pneumatically-driven motor to a source of fluid at a predetermined line pressure;

a first, manually-operable, normally-closed valve having an open position to which said first, manually-operable, normally-closed valve is movable from a normally-closed position;

a second fluid conduit fluidically connecting said source of fluid at said predetermined line pressure to said first, manually-operable, normally-closed valve;

variable flow-controlling means for adjustably controlling the rate of fluid flow therethrough;

a third fluid conduit fluidically connecting said first, manually-operable, normally-closed valve to said variable flow-controlling means;

a fluid reservoir having a predetermined volume;

a fourth fluid conduit fluidically connecting said variable flow-controlling means to said fluid reservoir;

said variable flow-controlling means being operable to control said rate of fluid flow to said fourth fluid conduit and to said reservoir, and the time for attaining fluid at said predetermined line pressure within said fourth fluid conduit and said reservoir, after said first, manually-operable, normally-closed valve is moved to said open position;

a second, pressure-operable, normally-open valve disposed within said first fluid conduit between said source of fluid and said pneumatically-driven motor for normally providing fluid flow to said pneumatically-driven motor when said second, pressure-operable, normally-open valve is disposed at its normally-open position, and comprising a pressure-responsive actuator fluidically connected to said fourth fluid conduit such that said second, pressure-operable, normally-open valve is operable by said predetermined line pressure within said fourth fluid conduit so as to be movable from said normally-open position to a closed position so as to block fluid flow from said source of fluid to said pneumatically-driven motor at a predetermined time after manual actuation of said first, manually-operable, normally-closed valve to said open position; and a third, pressure-operable, two-position valve, disposed within said first fluid conduit and fluidically connected to said third fluid conduit at a position upstream of said variable flow-controlling means so as to be responsive to said fluid at said predetermined line pressure within said third fluid conduit when said first, manually-operable, normally-closed valve is disposed at said open position, for providing restricted fluid flow from said source of fluid to said pneumatically-driven motor, as a result of said third, pressure-operable, two-position valve being disposed at a first position when said first, manually-operable, normally-closed valve is disposed at said closed position, such that said pneumatically-operable tool is operable at a restricted power level during a first tightening phase of a strapping operation, and for providing unrestricted fluid flow from said source of fluid to said pneumatically-driven motor, as a result of said third, pressure-operable, two-position valve being moved, from said first position to a second position, by said fluid at said predetermined line pressure within said third fluid conduit when said first, manually-operable, normally-closed valve is disposed at said open position, such that said pneumatically-operable tool is operable at an unrestricted power level during a second securing phase of a strapping operation.

16. The tool as set forth in claim 15, further comprising:

a fourth, manually-operable, normally-closed valve disposed within said first fluid conduit and interposed between said pneumatically-driven motor and said third, pressure-operable, two-position valve for permitting fluid flow from said source of fluid to said pneumatically-driven motor when said fourth, manually-operable, normally-closed valve is moved from a normally-closed position to an open position.

17. The tool as set forth in claim 16, further comprising:

handle means for moving said first, manually-operable, normally-closed valve from said normally-closed position to said open position; and lever means for moving said fourth, manually-operable, normally-closed valve from said normally-closed position to said open position.

18. The tool as set forth in claim 15, wherein said variable flow-controlling means comprises:

an adjustable flow control valve; and a one-way check valve disposed parallel to said adjustable flow control valve and connected to said third and fourth fluid conduits at locations upstream and downstream of said adjustable flow control valve so as to bypass said adjustable flow control valve and exhaust said fluid reservoir through said first, manually-operable, normally-closed valve when said pneumatically-driven motor is deactivated as a result of said second, pressure-operable, normally-open valve being moved to said closed position so as to block said fluid flow from said source of fluid to said pneumatically-driven motor and said first, manually-operable, normally-closed valve is returned to said closed position.

19. The tool as set forth in claim 15, wherein:

said reservoir comprises a predetermined length of tubing having a predetermined diametrical extent and connected between said variable flow-controlling means and said second, pressure-operable, normally-open valve.

20. The tool as set forth in claim 15, wherein:

said third, pressure-operable, two-position valve comprises an adjustable restrictor for providing adjustable levels of said restricted fluid flow.

* * * * *